United States Patent [19]

Sulfstede et al.

[11] Patent Number: 4,912,938
[45] Date of Patent: Apr. 3, 1990

[54] DC VOLTAGE BLEEDER FOR A VARIABLE SPEED AIR CONDITIONER

[75] Inventors: Louis E. Sulfstede; C. Lee Stamp, Jr., both of Tyler, Tex.

[73] Assignee: American Standard Inc., New York, N.Y.

[21] Appl. No.: 387,190

[22] Filed: Jul. 28, 1989

[51] Int. Cl.⁴ ............................................. F25B 31/00
[52] U.S. Cl. ......................................... 62/192; 62/472; 62/230; 62/84; 361/22
[58] Field of Search ............... 62/192, 193, 230, 468, 62/469, 470, 471, 472, 84, 228.4; 361/22, 117, 33, 126, 131; 307/326; 323/208, 209, 210; 320/1

[56] References Cited

U.S. PATENT DOCUMENTS

| | | | |
|---|---|---|---|
| 3,133,429 | 5/1964 | Griffin | 62/469 |
| 3,237,848 | 3/1966 | Pihl et al. | 230/58 |
| 3,705,499 | 12/1972 | Mount et al. | 62/84 |
| 4,066,869 | 1/1978 | Apaloo et al. | 62/84 |
| 4,371,829 | 2/1983 | Salowe et al. | 323/209 |
| 4,543,797 | 10/1985 | Vogel et al. | 62/193 |

Primary Examiner—Harry B. Tanner
Attorney, Agent, or Firm—William J. Beres; William O'Driscoll

[57] ABSTRACT

In a variable speed air conditioning system driven by an electronically commutated DC motor, the large DC capacitor associated with the compressor motor drive discharges to the normally AC powered compressor oil sump heater upon the loss of AC power to the system.

16 Claims, 3 Drawing Sheets

DC VOLTAGE BLEEDER FOR A VARIABLE SPEED AIR CONDITIONER

BACKGROUND OF THE INVENTION

The present invention relates generally to controls for a variable speed air conditioner or heat pump system. More specifically, the present invention relates to a method and apparatus for insuring that the voltage on a large DC capacitor employed in the control of a DC motor driven variable speed air conditioning system is safely discharged when system power is interrupted or disconnected.

Heretofore, large power resistors, integral with variable speed air conditioning system motor drive electronics, have been switched across the large DC capacitor employed in the delivery of DC power to the system's DC motor-compressor to cause the capacitor to discharge when AC system power was lost. The purpose of the arrangement was to insure that when AC power to the system was interrupted or lost, the capacitor discharged to a safe level before service personnel attempted to service the equipment. Previously, the large motor control power resistors to which the capacitor was discharged had been integral with the drive electronics by which the system's motor-compressor was driven.

New electronically commutated motor drives have eliminated the need for the large (and expensive) power resistors. As earlier mentioned, the primary function of such power resistors related to the control and driving of the system's compressor. The discharge of the DC capacitor to the power resistors was a matter of convenience and, with respect to the power resistors themselves a secondary function. The elimination of the large power resistors by virtue of the advance in motor drive design has required that alternative discharge circuitry, external to the motor drive, be implemented for safely discharging the DC capacitor. Such circuitry, of necessity, requires the inclusion of a large resistor.

The need therefore exists to provide for capacitor discharge circuity, external of the motor drive in a variable speed air conditioning or heat pump system driven by an electronically commutated DC motor, preferably without the need to provide a discrete resistor dedicated to the capacitor discharge function.

SUMMARY OF THE INVENTION

It is an object of the present invention to provide for the safe discharge of a large DC capacitor in air conditioning and heat pump systems employing variable speed motor drives.

It is a further object of the present invention to provide for the controlled discharge of a large DC capacitor in a variable speed air conditioning or heat pump system other than through motor drive components such as power resistors.

It is another object of the present invention to provide circuity which includes a highly resistive element to which a large DC capacitor is automatically discharged, in a variable speed air conditioning system, when system power is disrupted or lost.

It is a further object of the present invention to provide for the discharge of a large DC capacitor associated with the control of a DC motor-compressor in a variable speed air conditioning system, without providing for a discrete resistive element dedicated solely to facilitating capacitor discharge under the circumstances of system power loss or disruption.

Finally, it is an object of the present invention to provide for the discharge of a large DC capacitor to safe levels, prior to the servicing of associated air conditioning system equipment, other than through or into other motor drive components and in a manner which is efficiently and inexpensively accomplished.

These and other objects of the present invention, which will become apparent when the following Description of the Preferred Embodiment and attached drawing figures are considered, are accomplished by discharge circuity in a variable speed air conditioning or heat pump system which interconnects the compressor motor drive electronics to other system circuitry having a large resistor serving an otherwise unrelated function.

In the system of the present invention circuitry is established by which, upon the loss or disruption of system AC power, the DC capacitor in the compressor motor drive system is connected across and discharges to an electrical resistance heater. The heater is otherwise entirely disassociated with compressor drive electronics and is employed to warm the oil in the sump of the system compressor when the system is operating normally and environmental conditions warrant.

The sump heater is powered from an AC line through the normally closed contacts of a relay when a thermal switch closes indicating the need for the heating of compressor sump oil. At such time as the AC line is disconnected or line voltage is lost to the air conditioning system, including the sump heater, the relay is deactivated to its normally closed position thereby isolating the sump heater from the AC power line and causing the completion of a circuit by which the large DC capacitor associated with the delivery of stable DC power to the motor drive electronics discharges to the oil sump heater through a set of relay contacts which close upon the loss of AC power to the system.

The present invention allows the compressor sump heater to serve in its normal oil heating function and, as well, to function as the element to which the motor drive capacitor discharges upon the interruption or disconnection of system power without the need to provide a discrete and expensive resistive element the sole purpose of which is to assist in the capacitor discharge process.

DESCRIPTION OF THE PREFERRED EMBODIMENT

Figure 1:
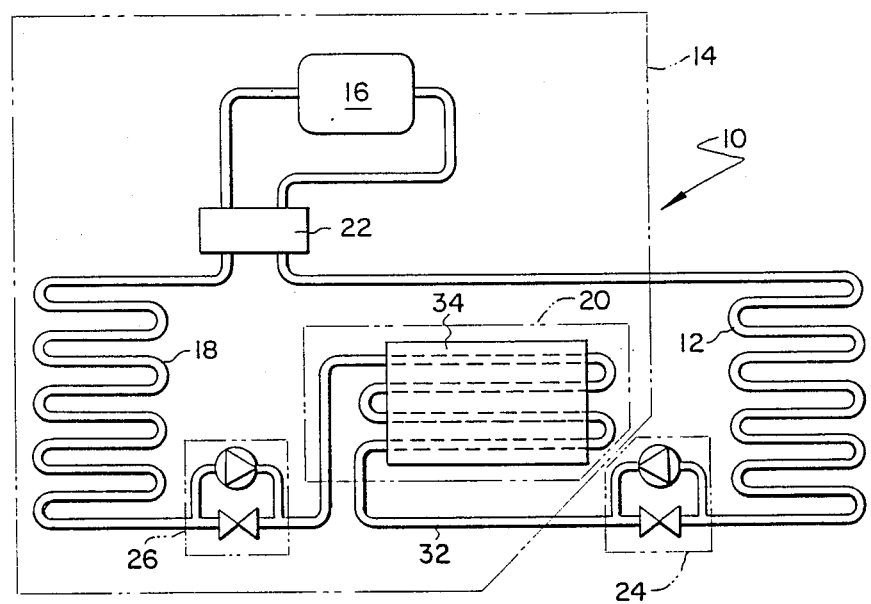
FIG. 1 is a schematic view of the heat pump system of the present invention.
Figure 2:
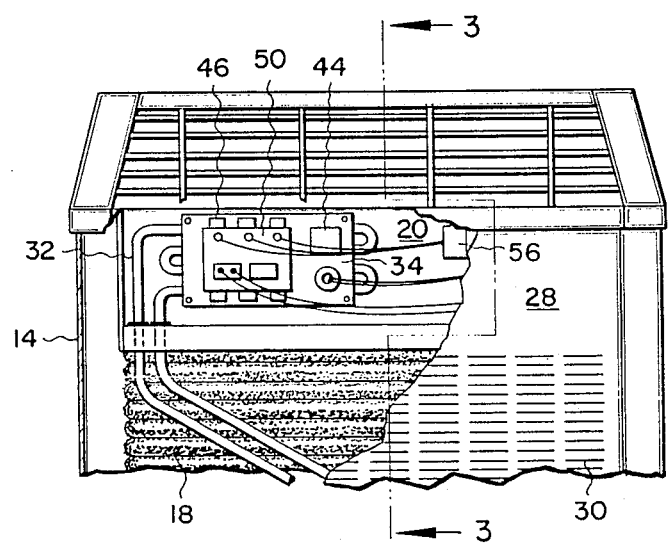
FIG. 2 is a side view of the outdoor cabinet section of the heat pump system of FIG. 1 in which a broken away access panel is illustrated.
Figure 3:
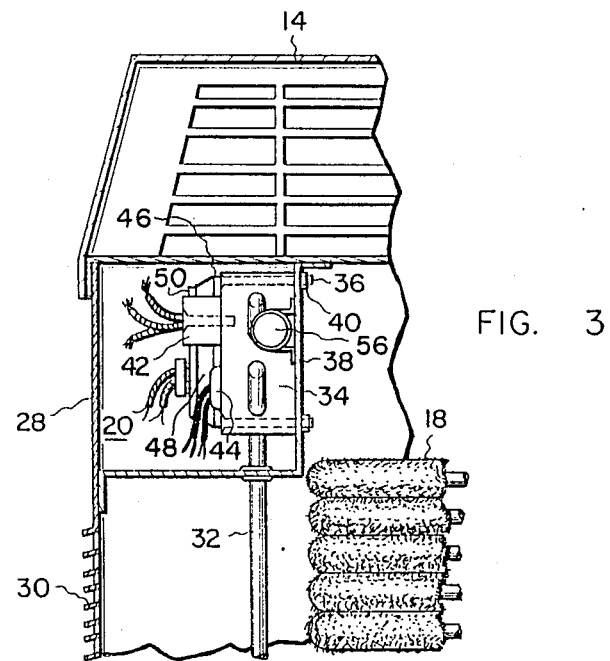
FIG. 3 is taken along lines 3—3 of FIG. 2.
Figure 4:
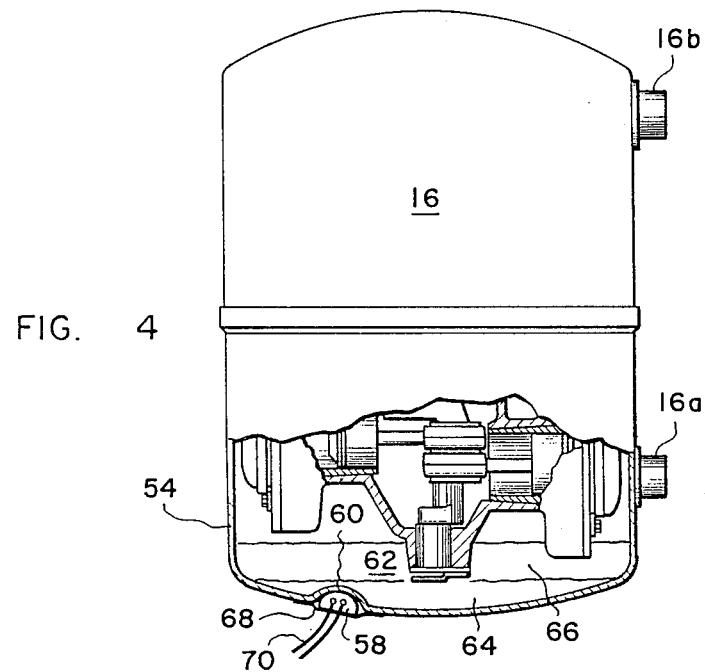
FIG. 4 is a cutaway view of the hermetic compressor of the air conditioning system of the present invention and of the resistance heater employed thereby to heat sump oil.

Referring concurrently to all five drawing figures, heat pump system 10 is generally comprised of an indoor heat exchanger 12 and an outdoor cabinet section 14. Outdoor cabinet section 14 houses variable speed compressor 16 as well as outdoor heat exchanger 18 and defines a controls compartment 20 in which various system controls are disposed.

Cabinet section 14 further houses a reversing valve 22 by which the flow of refrigerant through the system can be reversed in accordance with the mode of heat pump operation called for. Although the present invention will be described in terms of a heat pump type air conditioning system, it is equally applicable to a cooling only air conditioning system.

Compressor 16 is a variable speed compressor, preferably driven by an electronically commutated DC motor. In addition to the components mentioned in the paragraph above, outdoor cabinet section 14 houses a fan and refrigerant piping and plumbing connections. Such piping includes the piping which connects the suction and discharge ports 16a and 16b of compressor 16 to the reversing valve 22 and piping which connects the reversing valve to the indoor and outdoor heat exchangers.

In typical heat pump systems the indoor and outdoor heat exchangers are connected for flow by refrigerant piping which has metering devices disposed therein. The metering devices operate, when refrigerant flow is in the appropriate direction, to meter refrigerant to the heat exchanger with which the metering device is associated.

Each metering device is attached to or is disposed in the immediate vicinity of the heat exchanger with which it is associated and is capable of being bypassed when the direction of refrigerant flow through the system is in a direction away from the associated heat exchanger. In the drawing figures, heat exchanger 12 is associated with metering/bypass valve 24 while outdoor heat exchanger 18 is associated with combination metering/bypass valve 26.

Controls compartment 20 in outdoor cabinet section 14 houses various system control components, including components which power and control the speed of compressor 16. Cabinet side panel 28, through which access is gained to the interior of outdoor section 14 and controls compartment 20, includes a plurality of louvers through which air is drawn into and through the outdoor heat exchanger 18.

The upper portion of panel 28 is solid and overlies controls compartment 20 so as to protect the components and controls therein from the environment. The solid upper portion of panel 28 cooperates with the remainder of outdoor cabinet section 14 to define a closed, essentially sealed compartment in which the system drive controls and components are housed.

In the heat pump system of the present invention, a portion of liquid line 32 passes through controls compartment 20 and a heat conductive block of material 34 is clamped thereon. The refrigerant liquid line is that portion of the refrigerant plumbing in a heat pump system which connects the two metering/bypass valves and in which refrigerant can be characterized as a relatively low temperature-low pressure liquid.

Block 34 is preferably fabricated from material such as aluminum and is provided to create an efficient path for the transfer of heat from compressor motor drive electronics disposed within compartment 20, through block 34 and into the relatively cool refrigerant passing through refrigerant liquid line 32. Block 34 is supported, in the preferred embodiment, within compartment 20 by bolts 36 which pass through block 34 and the backwall 38 of compartment 20. The bolts are typically secured by means such as nuts 40.

Typical of the components found within compartment 20 are rectifier 42 and thermal protective device 44 both of which are mounted on block 34. Thermal protective device 44 senses the surface temperature of block 34 and functions to disable the operation of compressor 16 when the temperature of block 34 exceeds a predetermined limiting temperature.

Additionally, pads 46 and drive supports 48 are attached to block 34. Pads 46 and supports 48 are thermally conductive and serve as a path for the transfer of heat from motor drive electronics 50 which are mounted thereon. Motor drive electronics 50 deliver power to the electronically commutated DC motor 52 which is disposed within hermetic shell 54 of motor compressor 16.

AC power is delivered into compartment 20 and is delivered to full wave rectifier 42. Rectifier 42 converts the AC power delivered to it to direct current. The direct current is delivered to drive electronics 50 through large DC capacitor 56 so that stable DC power is delivered to the motor-drive electronics. Therefore, under normal operating circumstances, the motor drive electronics 50 are supplied DC power from rectifier 42 and DC capacitor 56, which is also disposed in compartment 20, to drive DC motor driven compressor 16.

An electrical resistance oil sump heater 58 is attached to shell 54 of compressor 16. Heater 58 is preferably disposed in a formed, preferably seamless indentation 60 in the bottom of shell 54. Indentation 60 is formed at the bottom of shell 54 in a location adjacent oil sump 62 where liquid refrigerant 64 typically settles below oil 66 in the reservoir.

Although heater 58 may be a constant wattage-type heater, it will preferably have a positive temperature coefficient whereby its resistance increases with an increase in temperature so as to make it self-regulating. As the temperature of oil 66 and refrigerant 64 rises within shell 54, so does the temperature of heater 58. This causes the electrical resistance of heater 58 to increase as it performs its function while decreasing its power consumption.

Heater 58 is attached to shell 54 of compressor 16 by means of tape 68 which retains heater 58 in abutment against shell 56 to provide for the conductive transfer of heat from heater 58 through shell 54 or by insertion into a metal block that is welded to the outside of the shell and into the sump 62. Electrical leads 70 extend from heater 58 and are made available for connection to an AC power supply.

Figure 5:
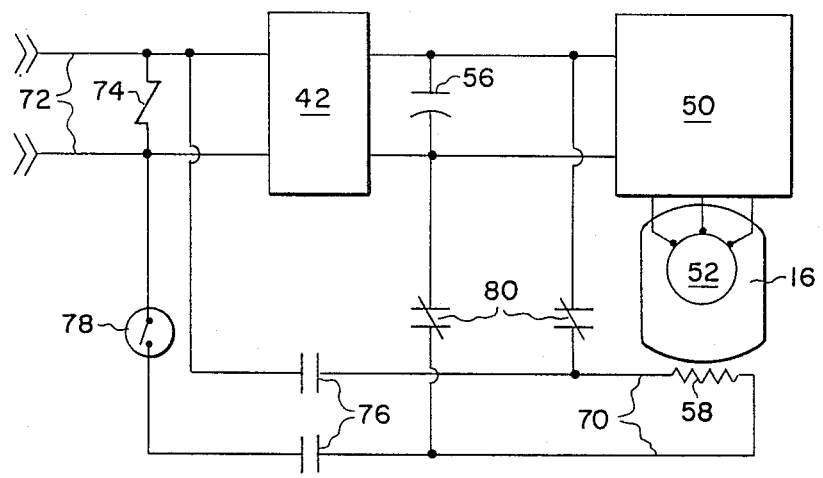
FIG. 5 is a schematic view of the present invention indicating the circuitry for accomplishing the discharge of a large DC capacitor, associated with the motor drive electronics in the variable speed air conditioning system of the present invention, to the compressor oil sump heater.

Referring particularly now to FIG. 5, it will be seen that leads 70 of sump heater 58 are connected to AC power line 72 through relay 74. When AC power is present in line 72 an electrical path through the closed contacts 76 of relay 74 is established. Disposed within that electrical path is a thermal switch 78 which closes, upon the occurrence of predetermined temperature conditions indicating the need for compressor oil sump heating, to permit the flow of AC power from line 72 to resistance heater 58.

The flow of power to resistance heater 58 causes the heat developed therein to be conducted through shell 54 into oil reservoir 62. When ambient conditions are such that sump heating is not called for, thermal switch 78 is open and heater 58 is disconnected from its source of AC power although contacts 76 of relay 74 remain closed.

When power in AC line 72 is disrupted or disconnected, contacts 80 of relay 74 close, as is illustrated in FIG. 5, while contacts 76 thereof open. AC power to sump heater 58 is therefore disconnected and heater 58 is electrically isolated from AC power line 72 even if thermal switch 78 is closed.

As earlier indicated, contacts 80 of relay 74 will be open whenever AC line 72 is connected to a source of AC power. When that source of AC power is disrupted, contacts 76, likewise as mentioned above, of relay 74 open and contacts 80 close whereupon sump heater 58 becomes disconnected from AC line 72 and is connected across DC capacitor 56.

The connection of DC capacitor 56 across the sump heater causes capacitor 56 to discharge to resistance heater 58 and results in the removal of high voltage from the heat pump system 10 allowing for safe system servicing. As has been noted, FIG. 5 illustrates the present invention in the state in which it is found upon the loss of AC power, i.e. contacts 76 are open, disconnecting heater 58 from AC line 72 and contacts 80 are closed, thereby providing a path for the discharge of capacitor 56 to the sump heater.

The present invention accomplishes the discharge of motor drive associated DC capacitor 56 in a manner independent of motor drive electronics and in a manner which does not require the use of discrete or additional resistive elements for the purpose of accomplishing the discharge of the capacitor upon the disruption of system power. By using the sump heater in such a capacity, system 10 is made safe for servicing in a manner which is inexpensive and convenient.

While the present invention has been described in terms of a preferred embodiment, it will be apparent that modifications thereto can be accomplished which are within the scope of the invention. Therefore, the present invention should not be limited other than by the language of the claims which follow.

What is claimed is:

1. An air conditioning system comprising:
   a compressor, said compressor including a DC motor disposed in a hermetic shell, said shell defining a sump in which oil collects;
   means for providing AC power to said system;
   a resistance heater, said heater being powered by AC power provided to said system by said means for providing AC power, for heating the oil which collects in said sump;
   means, including a DC capacitor, for supplying DC power to drive said DC motor; and
   means for disconnecting said heater from said means for providing AC power to said system and for connecting said DC capacitor across said heater so as to cause said DC capacitor to discharge to said heater when AC power to said system is interrupted.

2. The air conditioning system according to claim 1 wherein said means for disconnecting comprises a relay, said relay having a first set of contacts which are closed in the presence of AC system power and a second set of contacts which are open in the presence of AC system power.

3. The air conditioning system according to claim 2 wherein said means for supplying DC power includes means for converting AC power provided to said system to DC power.

4. The air conditioning system according to claim 3 wherein said means for converting comprises a full wave recitifier.

5. The air conditioning system according to claim 4 further comprising an electrical flow path between said DC capacitor and said second set of relay contacts, said second set of relay contacts closing and said first set of relay contacts opening when AC power to said system is interrupted.

6. The air conditioning system according to claim 5 further comprising a thermal switch, said thermal switch closing upon the existence of predetermined environmental conditions to provide AC power to said heater whenever AC power is being provided by said means for providing AC power to said system.

7. The air conditioning system according to claim 6 wherein said DC motor is an electronically commutated DC motor.

8. An air conditioning system comprising:
   an alternating current supply line;
   means for converting AC power received through said supply line to DC power;
   a DC motor-compressor;
   motor drive means through which DC power is provided to drive said motor-compressor;
   an electrical flow path for conveying DC power from said means for converting AC to DC power to said motor drive means;
   a DC capacitor disposed in said electrical flow path;
   an electrical resistance heater for heating oil in the sump of said motor-compressor, said heater being powered by AC power received from said AC supply line; and
   means for electrically isolating said heater from said AC power line and for connecting said DC capacitor across said heater when AC power to said system is interrupted, whereby said capacitor discharges to said heater.

9. The air conditioning system according to claim 8 wherein said means for isolating and connecting comprises a relay, said relay having a first set of contacts which are closed in the presence of AC power in said alternating current supply line and a second set of contacts which are open in the presence of AC power in said supply line.

10. The air conditioning system according to claim 9 further comprising a thermal switch disposed in a second electrical flow path between said AC supply line and said heater, said switch closing and AC power being supplied to said heater through said first set of relay contacts whenever AC power is present in said supply line and environmental temperature conditions call for the heating of compressor sump oil.

11. The air conditioning system according to claim 10 wherein said means for converting comprises a full wave rectifier.

12. The air conditioning system according to claim 11 further comprising a third electrical flow path between said DC capacitor and said second set of relay contacts, said second set of contacts closing and said first set of contacts opening upon the interruption of AC power to said system to provide an electrical flow path by which said DC capacitor discharges to said heater.

13. The air conditioning system according to claim 12 wherein the motor portion of said motor-compressor is an electronically commutated DC motor.

14. A method of controlling an air conditioning system which includes a DC motor-compressor the sump of which is heated by an electrical resistance heater when environmental conditions warrant, comprising:
   providing AC power to said system through an AC power line;
   converting said AC power to DC power to provide DC system power to charge a DC capacitor employed in driving said motor-compressor;
   providing AC power from said AC power line to power said resistance heater when environmental temperature conditions call for sump heating;
   electrically isolating said sump heater from said AC power line upon the interruption of AC power in said power line; and
   completing an electrical path between said DC capacitor and said sump heater upon the interruption of AC power in said AC power line so that said capacitor is caused to discharge across said heater when AC system power is interrupted.

15. The method according to claim 14 wherein said converting step includes the step of rectifying said AC power through the use of a full wave rectifier.

16. The method according to claim 15 wherein said isolating step includes the step of opening a first set of contacts in a relay and wherein said completing step includes the step of closing a second set of contacts in that relay.

* * * * *